(12) United States Patent
Fukumoto

(10) Patent No.: US 8,672,276 B2
(45) Date of Patent: Mar. 18, 2014

(54) CLAMP

(75) Inventor: Mitsuru Fukumoto, Utsunomiya (JP)

(73) Assignee: Nifco Inc., Yokohama-shi (JP)

( * ) Notice: Subject to any disclaimer, the term of this patent is extended or adjusted under 35 U.S.C. 154(b) by 7 days.

(21) Appl. No.: 13/582,311

(22) PCT Filed: Feb. 28, 2011

(86) PCT No.: PCT/JP2011/001140
§ 371 (c)(1),
(2), (4) Date: Sep. 14, 2012

(87) PCT Pub. No.: WO2011/108243
PCT Pub. Date: Sep. 9, 2011

(65) Prior Publication Data
US 2013/0009019 A1 Jan. 10, 2013

(30) Foreign Application Priority Data
Mar. 5, 2010 (JP) .................. 2010-048553

(51) Int. Cl.
*F16L 3/10* (2006.01)
(52) U.S. Cl.
USPC .......... 248/67.5; 248/68.1; 248/73; 248/74.1; 248/316.1; 248/316.5
(58) Field of Classification Search
USPC .................. 248/67.5, 68.1, 71, 65, 73, 74.1, 248/229.13, 229.23, 228.4, 230.4, 231.51, 248/309.1, 316.1, 316.5; 24/458, 457, 530, 24/555, 564; 411/508, 509, 510
See application file for complete search history.

(56) References Cited

U.S. PATENT DOCUMENTS

| 4,840,333 A | * | 6/1989 | Nakayama | 248/68.1 |
| 5,033,701 A | * | 7/1991 | Kraus | 248/68.1 |
| 5,271,588 A | * | 12/1993 | Doyle | 248/68.1 |
| 5,476,350 A | * | 12/1995 | Kurtz et al. | 411/80.2 |
| 6,915,990 B2 | * | 7/2005 | Maruyama | 248/68.1 |

(Continued)

FOREIGN PATENT DOCUMENTS

| JP | S58-186277 U | 12/1983 |
| JP | S63-29982 Y2 | 8/1988 |

(Continued)

OTHER PUBLICATIONS

Japanese Patent Office, "Office Action for JP 2010-048553", Aug. 27, 2013.

*Primary Examiner* — Todd M Epps
(74) *Attorney, Agent, or Firm* — Manabu Kanesaka

(57) ABSTRACT

A pipe clamp, for installing a filler pipe on a vehicle body panel having a locking hole, includes a base member, a lid member, and a pin member. The base member is arranged on the vehicle body panel and includes a pin hole, a plurality of leg piece parts placed projecting from a perimeter edge part of the pin hole and capable of projecting into the locking hole, and pipe holding parts. The lid member is provided rotatably on the base member, and locks to the base member when rotated to a closed position covering the pipe holding parts. The pin member is held in the pin hole displacing the leg piece parts outwardly in a radial direction of the pin hole to engage the leg piece parts in the locking hole. The lid member has an access hole exposing the pin member to the outside when in closed position.

5 Claims, 12 Drawing Sheets

(56) References Cited

U.S. PATENT DOCUMENTS

| | | | |
|---|---|---|---|
| 7,172,162 B2* | 2/2007 | Mizukoshi et al. | 248/68.1 |
| 7,267,307 B2* | 9/2007 | Bauer | 248/65 |
| 7,530,536 B2* | 5/2009 | Hashimoto | 248/68.1 |
| 7,887,012 B2* | 2/2011 | Desai et al. | 248/55 |

FOREIGN PATENT DOCUMENTS

| | | |
|---|---|---|
| JP | H01-69318 U | 5/1989 |
| JP | H06-69418 U | 9/1994 |
| JP | H07-20483 U | 4/1995 |
| JP | 2005-027475 A | 1/2005 |

* cited by examiner

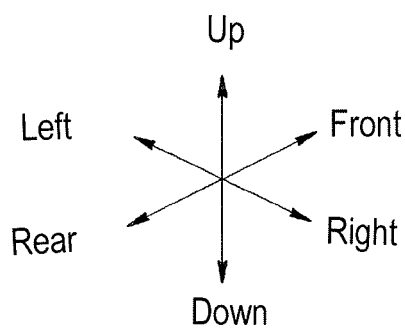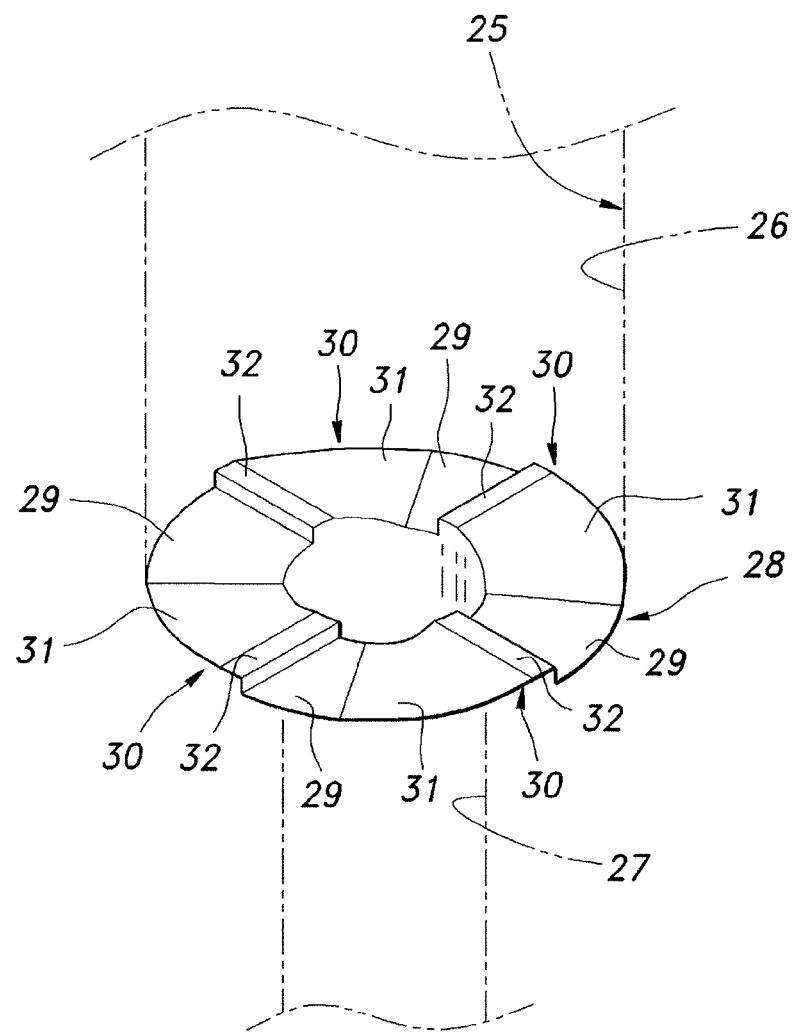
Fig. 6

CLAMP

RELATED APPLICATIONS

The present application is National Phase of International Application No. PCT/JP2011/001140 filed Feb. 28, 2011, and claims priority from Japanese Application No. 2010-048553, filed Mar. 5, 2010.

TECHNOLOGICAL FIELD

The present invention relates to a clamp, and more specifically relates to a pipe clamp for installing a filler pipe, or the like, on a vehicle body panel.

BACKGROUND TECHNOLOGY

There is a clamp for installing a filler pipe or other tubular body on a vehicle body panel or other support member having a locking hole formed thereon, having a first portion being installed on the support member and a second portion being provided rotatably on the first portion, and being configured to hold the tubular body between the first portion and the second portion (for example, Patent Document 1). In Patent Document 1, the first portion has a grommet part for opening and coupling in the locking hole when a screw is fixed inside. The second portion has a through-hole on a portion corresponding to the grommet part in a state in which the tubular body is held between with the first portion. The screw is inserted into the grommet part through the through-hole in the state in which the tubular body is held between the second portion and the first portion. By such configuration, holding of the tubular body using the clamp and coupling of the clamp to the support member are accomplished simultaneously when the screw is inserted into the grommet part through the through-hole.

PRIOR ART DOCUMENTS

Patent Documents
    Patent Document 1: Japanese Examined Utility Model Publication No. S63-29982

SUMMARY OF THE INVENTION

Problems to Be Solved by the Invention

With the clamp according to Patent Document 1, there is a problem that the number of parts is increased and the installation work becomes complicated because a screw separate from the first member and the second member is required. Also, there is a problem that the clamp has low general utility in usage modes because the coupled state cannot be completed only with the tubular body or only with the support member. Although the clamp according to Patent Document 1 can be provisionally coupled with the tubular body by catching between the first portion and the second portion, in this state the clamp is weakly coupled movably in the lengthwise direction of the tubular body, and it is difficult to secure the clamp at a prescribed position of the tubular body.

The present invention has been created in consideration of the above background, and an object is to provide a clamp with which the installation operation is easy.

Means for Solving the Problems

In order to solve the abovementioned problem, the present invention is a clamp (10) for installing tubular bodies (200, 201) on a support member (205) having a locking hole (206) formed thereon, comprising: a first member (1) arranged on a surface of said support member and having a first member through-hole (25) formed in a position corresponding to said locking hole, said first member having a plurality of flexible leg piece parts (16) placed to project from a perimeter edge part of said first member through-hole on a support member side and being capable of projecting into said locking hole, and tubular body holding parts (17, 18) provided on portions on a side opposite the support member side and allowing contact by said tubular bodies; a second member (12) provided rotatably on said first member and locked to said first member in a state having been rotated to a closed position covering said tubular body holding parts, said second member holding said tubular bodies in between with said tubular body holding parts; and a pin member (13) held in said first member through-hole and displaced toward a leading end side of said leg piece parts to displace said leg piece parts outwardly in a radial direction of said first member through-hole to engage said leg piece parts with said locking hole. Said second member has formed thereon a second member through-hole (86) exposing an end part of said pin member on a side opposite the support member side to the outside in the state being in said closed position.

Also, the present invention is a clamp (300) for installing tubular bodies (200, 201) on a support member (205) having a locking hole (206) formed thereon, comprising: a first member (11) arranged on an upper surface of said support member and having a first member through-hole (301) formed in a position corresponding to said locking hole, said first member having tubular body holding parts (17, 18) provided on portions on a side opposite a support member side and allowing contact by said tubular bodies; a second member (12) provided rotatably on said first member and locked to said first member in a state having been rotated to a closed position covering said tubular body holding parts, said second member having a second member through-hole (25) formed in a position corresponding to said first member through-hole in the state of said closed position and having a plurality of flexible leg piece parts (16) placed to project from a perimeter edge part of said second member through-hole on a side facing said support member and being capable of passing through said first member through-hole and projecting into said locking hole; and a pin member (13) held in said second member through-hole and displaced toward a leading end side of said leg piece parts to displace said leg piece parts outwardly in a radial direction of said second member through-hole to engage said leg piece parts with said locking hole. Also, in this invention, the second member has a boss part (302) on an end part of said second member through-hole on the support member side. Said boss part passes through said first member through-hole so that a projecting end thereof is capable of contacting with a perimeter edge part of said locking hole. Said leg piece parts are placed to project inside a radial direction of the projecting end of said boss part and are capable of projecting into said locking hole.

By these configurations, the clamp has favorable operability when installing the tubular bodies on the support member because the base member, lid member, and pin member are provided as an integrally assembled assembly. Also, coupling between the clamp and the tubular bodies and coupling between the clamp and the support member can be performed independently of each other.

Also, in the present invention, two of said tubular body holding parts are provided so as to hold said first member through-hole in between when being viewed in an axial direction of said first member through-hole.

By this configuration, the stability of installation of the tubular bodies on the support member is improved.

Effect of the Invention

By the above configuration, the operation of installation of the tubular bodies on the support member is made easier because the clamp is configured as a single assembly.

BRIEF DESCRIPTION OF THE DRAWINGS

FIG. 6 is a perspective view illustrating the pin hole of the base member according to the first embodiment.

EMBODIMENTS OF THE INVENTION

Figure 1:
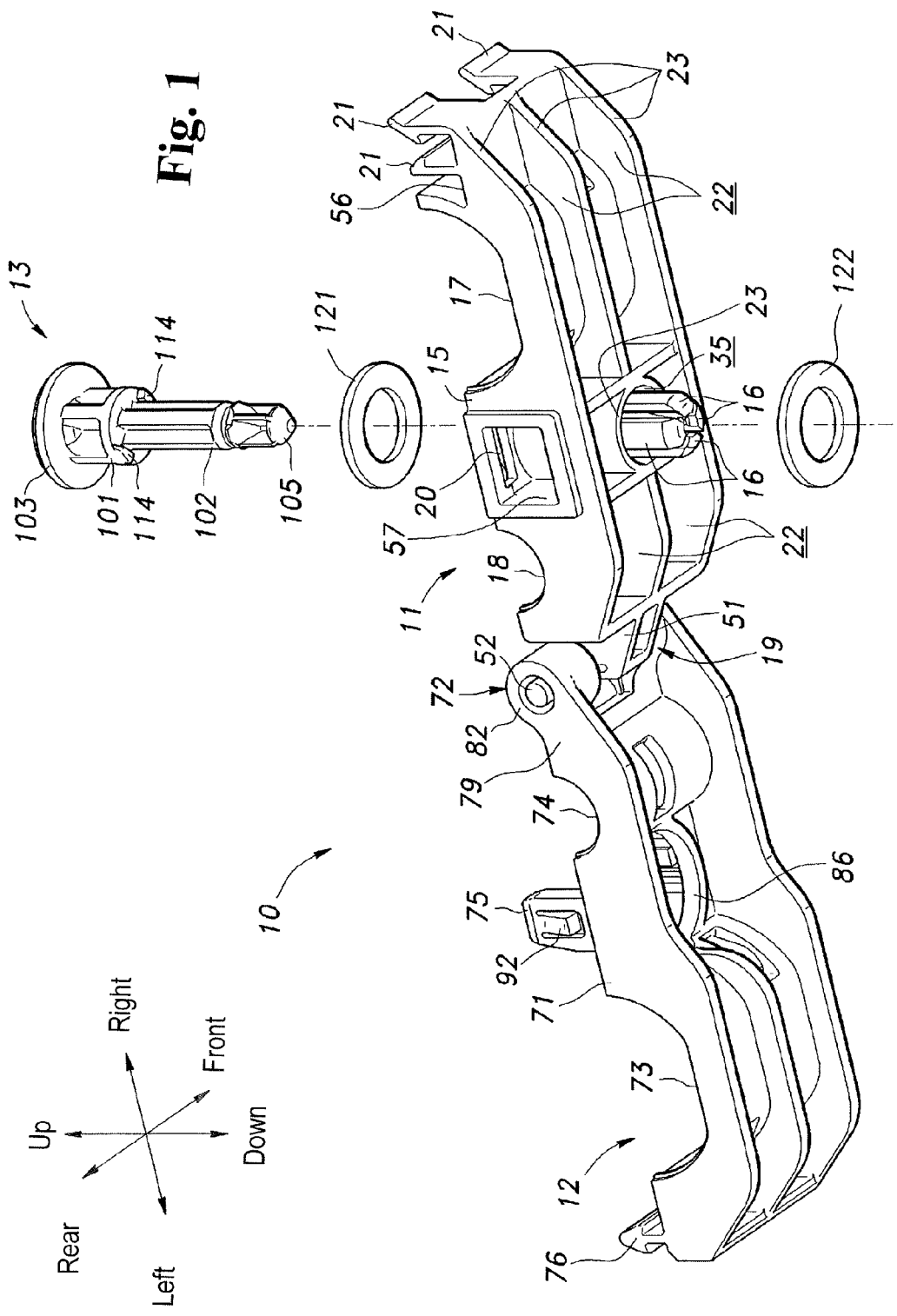
FIG. 1 is a exploded perspective view illustrating the pipe clamp according to the first embodiment.
Figure 2:
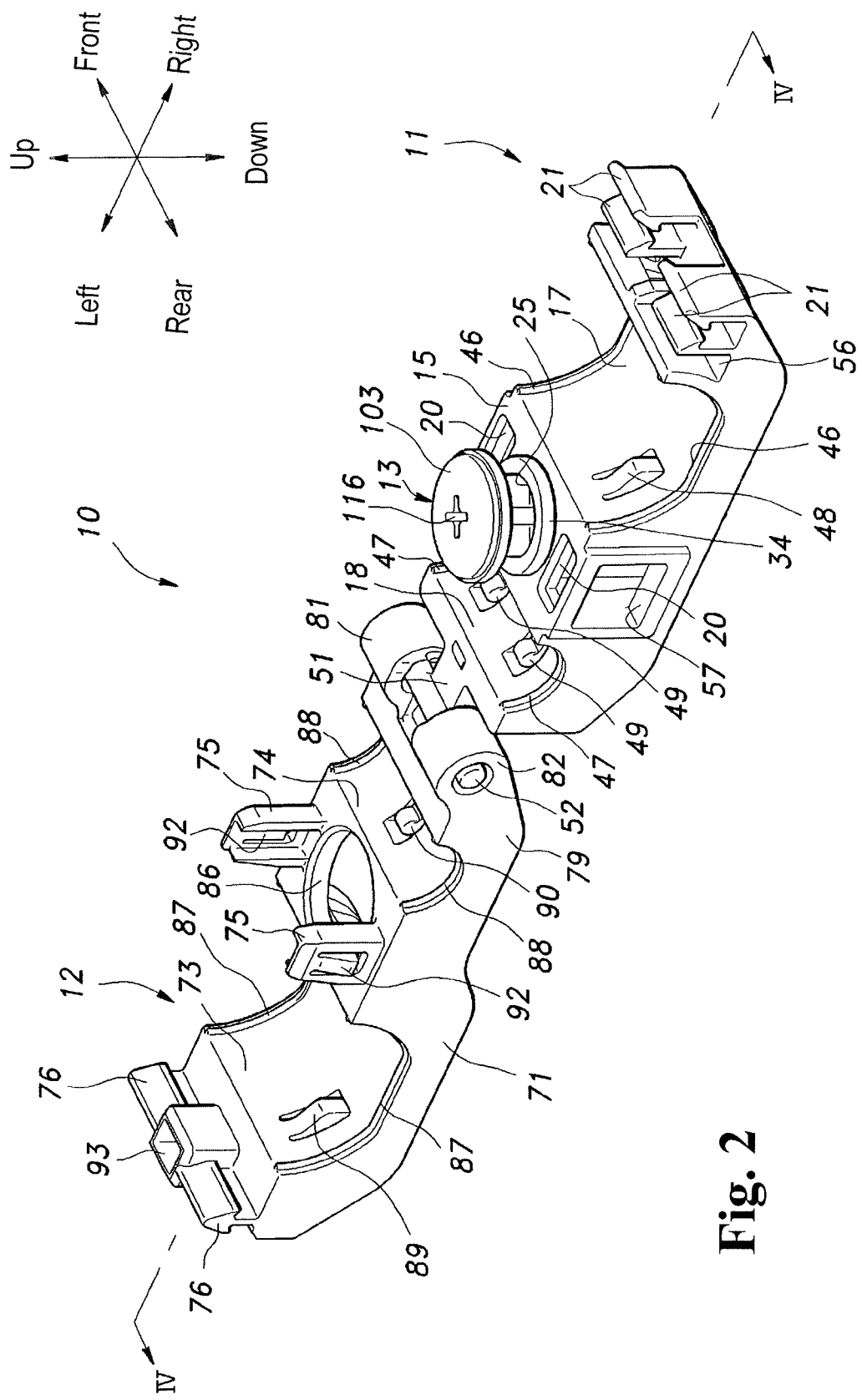
FIG. 2 is a perspective view illustrating the pipe clamp according to the first embodiment.

The present invention is described below with respect to embodiments applied to a pipe clamp for installing a filler pipe and a breather pipe to a vehicle body panel with reference to the drawings. In the description below, the description is given based on the coordinate axes illustrated in FIG. 1.

<First Embodiment>

As illustrated in FIGS. 1 to 4, the pipe clamp (clamp) 10 has as main constituent elements a base member (first member) 11, a lid member (second member) 12 being supported to be capable of rotating on the base member 11, and a pin member 13 being held on the base member 11, these members respectively being formed from resin material. With the pipe clamp 10, a filler pipe 200 and a breather pipe 201, which are tubular bodies, are held between the base member 11 and the lid member 12, and the base member 11 is installed on an upper surface of a vehicle body panel 205 as a support member, whereby the filler pipe 200 and breather pipe 201 are secured on the vehicle body panel 205.

<Base member>

As illustrated in FIGS. 1 to 4, the base member 11 has a main body part 15 extending in the left to right direction, leg piece parts 16 placed to project downward from a lower part of the main body part 15, first and second pipe holding parts 17 and 18 placed in recessed form on an upper part of the main body part 15, a hinge shaft part 19 provided on a left end part of the main body part 15, two connection holes 20 and four connection claws formed on the upper part of the main body part 15 as a part for coupling with the lid member 12.

The lower part of the main body part 15 has a plurality of downwardly opening dugout parts 22 placed in a recessed form in suitable places, and a plurality of ribs 23 formed so as to partition each dugout part 22. A lower end of each rib 23 is arranged on a virtual plane to become roughly on the same plane, and the main body part 15 is capable of contacting with a flat planar surface (plate member, or the like) on the lower part.

Figure 4:
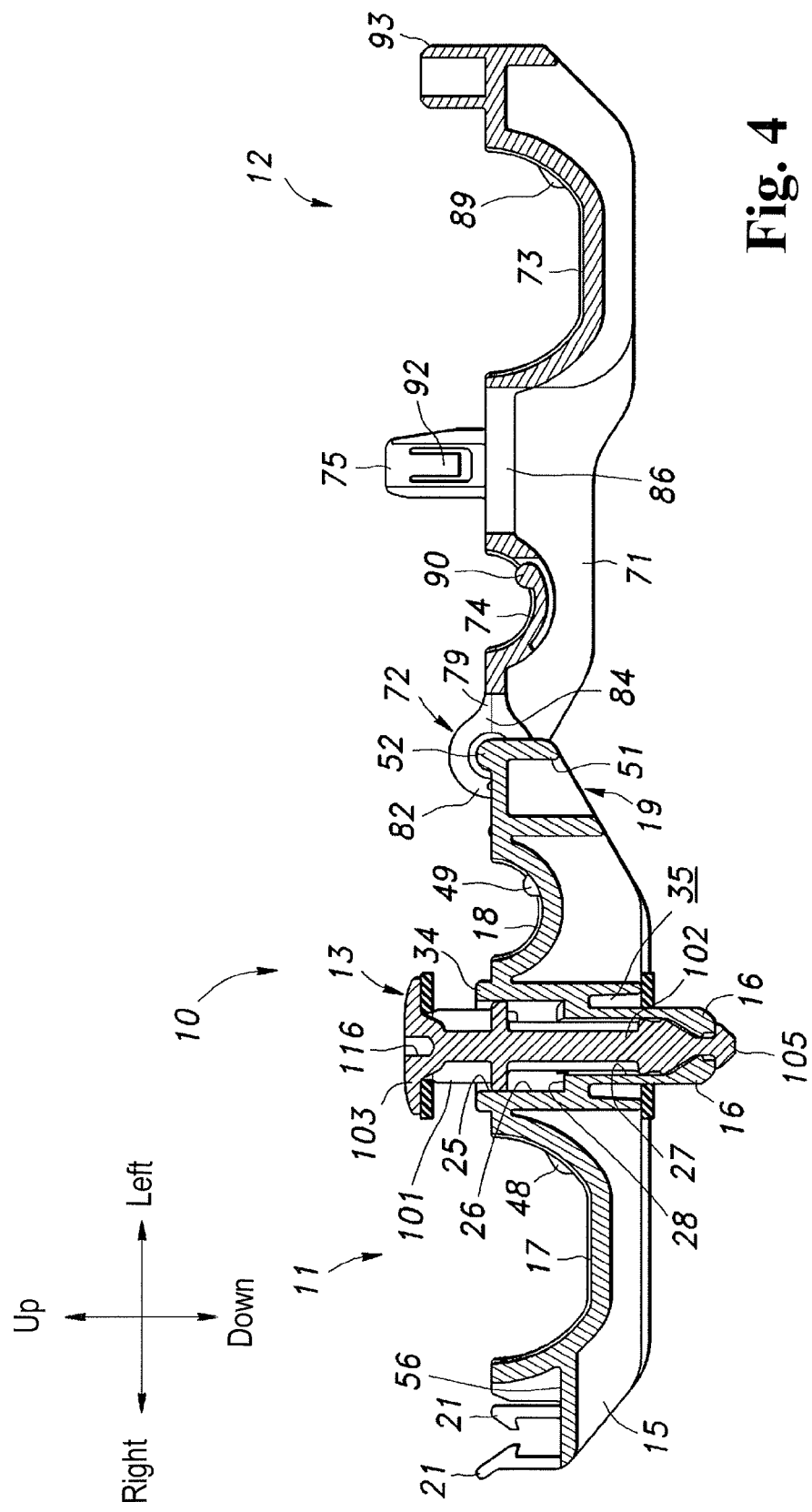
FIG. 4 is a cross-sectional view along the line IV-IV in FIG. 2.

A pin hole (first member through-hole) 25 extending in the vertical direction and connecting the upper surface and lower surface of the main body part is formed in a middle part in the left to right direction of the main body part 15. As illustrated in FIG. 4, the pin hole 25 is circular in section, an upper half part 26 has an enlarged diameter coaxially with respect to a lower half part 27, and a circular annular step part 28 facing upward is formed at a boundary portion between the two halves.

As illustrated in FIG. 6, the step part 28 has four upwardly projecting guide bump parts 30 on top of an upwardly facing bottom surface 29 thereof at equal spacing (90° spacing) in the circumferential direction. Each guide bump part 30 has an inclined surface 31 projecting upward from the bottom surface 29 while going in the counterclockwise direction in the circumferential direction of the pin hole 25 as viewed from above, and an upper surface 32 extending in the counterclockwise direction from the upper end of the inclined surface 31 in parallel with the bottom surface 29. An end part of the upper surface other than the side with the inclined surface 31 is continuous with the bottom surface 29 by way of a perpendicular planar surface.

A boss part 34 projecting further upward from the upper surface of the base member 11 is formed on an upper end part of the pin hole 25. An annular groove-form dugout part 25 is formed on a perimeter edge part of a lower end part of the pin hole 25 so as to surround the pin hole 25 coaxially.

Four downwardly projecting leg piece parts 16 are formed at equal spacing following the circumferential direction of the pin hole 25 from a portion inside of the portion where the dugout part 35 is formed on the perimeter edge part of the lower end part of the pin hole 25. Each leg piece part 16 functions as a grommet to be inserted in a locking hole 206 being formed on the vehicle body panel 205. A projecting part 37, having an inclined surface facing diagonally upward so as to project toward the center axis side of the pin hole 25 while going toward a leading end (lower end), is formed on a portion of each leg piece part 16 facing the center axis side of the pin hole 25. Each claw part 38 has a downwardly facing one-way surface on a lower end part thereof. Each leg piece part 16 is flexible and is capable of toppling in the radial direction of the pin hole 25.

A first pipe holding part (tubular body holding part) 17 and a second pipe holding part (tubular body holding part) 18 are placed in recessed form respectively toward the right and toward the left of the pin hole 25 on the upper surface of the base member 11. The first pipe holding part 17 and the second pipe holding part 18 have groove forms, and each extends in the front to rear direction continuing on the front surface and rear surface of the base member 11. The first pipe holding part 17 is formed in a flattened semicircular form in section so as to correspond with an outer surface of a filler pipe 200 to be described. Also, the second pipe holding part 18 is formed in a roughly semicircular form in section so as to correspond with an outer surface of a breather pipe 201 to be described.

Ridges 46 and 47 extending in the left to right direction are formed on upper surfaces of the first pipe holding part 17 and the second pipe holding part 18. Also, pressing pieces 48 and 49, each being cut out by a U-shaped slit connecting through to the dugout part 22 and having a raised part projecting inward (upward) of the first pipe holding part 17 or second pipe holding part 18 on a leading end part thereof, are formed on the upper surfaces of the first pipe holding part 17 and the second pipe holding part 18. The pressing pieces 48 and 49 are flexible and are capable of toppling. These ridges 46 and 47 and pressing pieces 48 and 49 are provided for the purpose of increasing a closeness of adhesion with the filler pipe 200 and the breather pipe 201.

A hinge shaft part 19 has a shaft support part 51 projecting toward the left from a left end surface of the main body part 15, and a round-columnar hinge shaft 52 projecting forward or rearward from a leading end part of the shaft support part 51. The shaft support part 51 is formed so as to have a roughly tetragonal shape as viewed from above or below, and a front surface and a rear surface of the shaft support part 51 extend following the left to right direction in parallel with each other (see FIG. 3). Raised parts 54 and 54 projecting forward or rearward and extending in the vertical direction are formed on portions being positioned below each hinge shaft 52 on a front surface and rear surface of the shaft support part 51.

Two upwardly opening connection holes 20 and 20 are placed in recessed form on the front and rear sides of the pin hole 25 on the upper surface of the main body part 15. Open portions on the upper ends of the connection holes 20 and 20 are formed much narrower than the insides. That is, the connection holes 20 and 20 have locking parts on the open portions on the upper ends. The insides of the connection holes 20 and 20 connect through to the front surface or rear surface of the base member 11 by way of operating openings 57 and 57.

A recessed part 56 sinking further downward from the upper surface is formed on a right end part of the upper part of the main body part 15. Four connection claws 21 are arranged in pairs, two each, on a bottom surface of the recessed part 56. Each connection claw 21 has a claw part having a flexible projecting piece part extending upward from the bottom part of the recessed part 56 and a downwardly facing one-way surface being provided on a leading end part of the projecting piece part. The respective pairs of connection claws 21 are arranged so that the respective claw parts are mutually opposite. Also, the paired two groups of connection claws 21 are arranged at a distance from each other on the front side and rear side of the recessed part 56.

<Lid Member>

As illustrated in FIGS. 1 to 4, the lid member 12 has a main body part 71 extending in the left to right direction, a hinge shaft bearing part 72 being formed on a right end part of the main body part 71, third and fourth pipe holding parts 73 and 74 being placed in recessed form on an upper part of the main body part 71, and two connection pieces 75 and two connection claws 76 being formed on the upper part of the main body part 71 as parts for coupling with the base member 11.

The hinge shaft bearing part 72 has a front fork part 78 and a rear fork part 79 projecting toward the right at a distance from each other in the front to rear direction from a right end part of the main body part 71, and shaft bearing parts 81 and 82 being provided on projecting end parts of each fork part 78 and 79. The shaft bearing parts 81 and 82 are arranged with the axes extending coaxially in the front to rear direction. A front end part or a rear end part of the hinge shaft 52 is freely fit into each shaft bearing part 81 or 82. The distance in the front to rear direction between each shaft bearing part 81 and 82 is set shorter than the length in the front to rear direction of the hinge shaft 52, so that the hinge shaft 52 cannot come out from each shaft bearing part 81 and 82. The positional relationships of such hinge shaft 52 and each shaft bearing part 81 and 82 are constructed by simultaneously forming the base member 11 and the lid member 12. Doing thus, the lid member 12 is supported to be capable of rotating on the base member 11 by way of a hinge part including the shaft bearing parts 81 and 82 and the hinge shaft 52.

Figure 3:
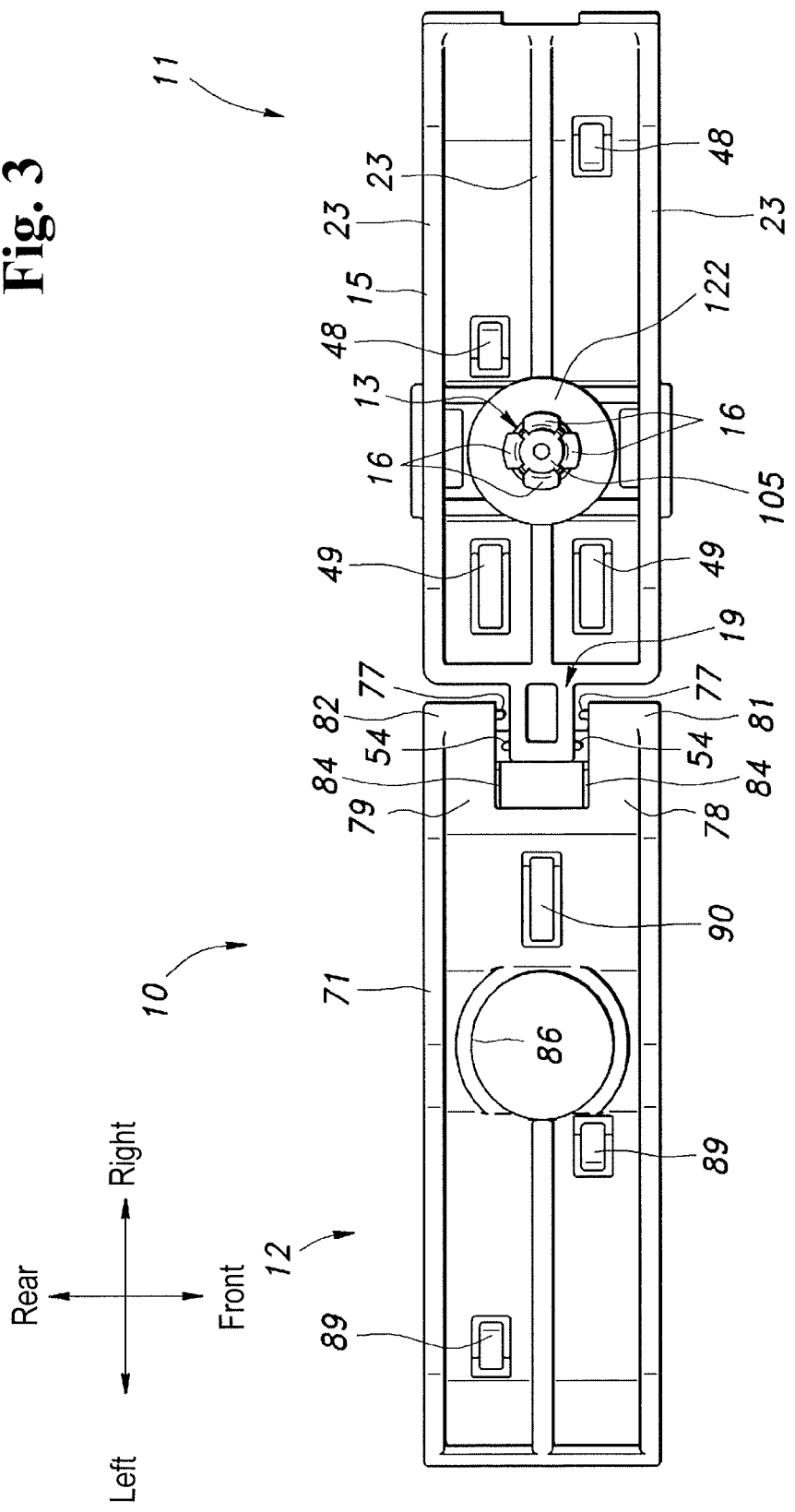
FIG. 3 is a bottom view illustrating the pipe clamp according to the first embodiment.
Figure 7:
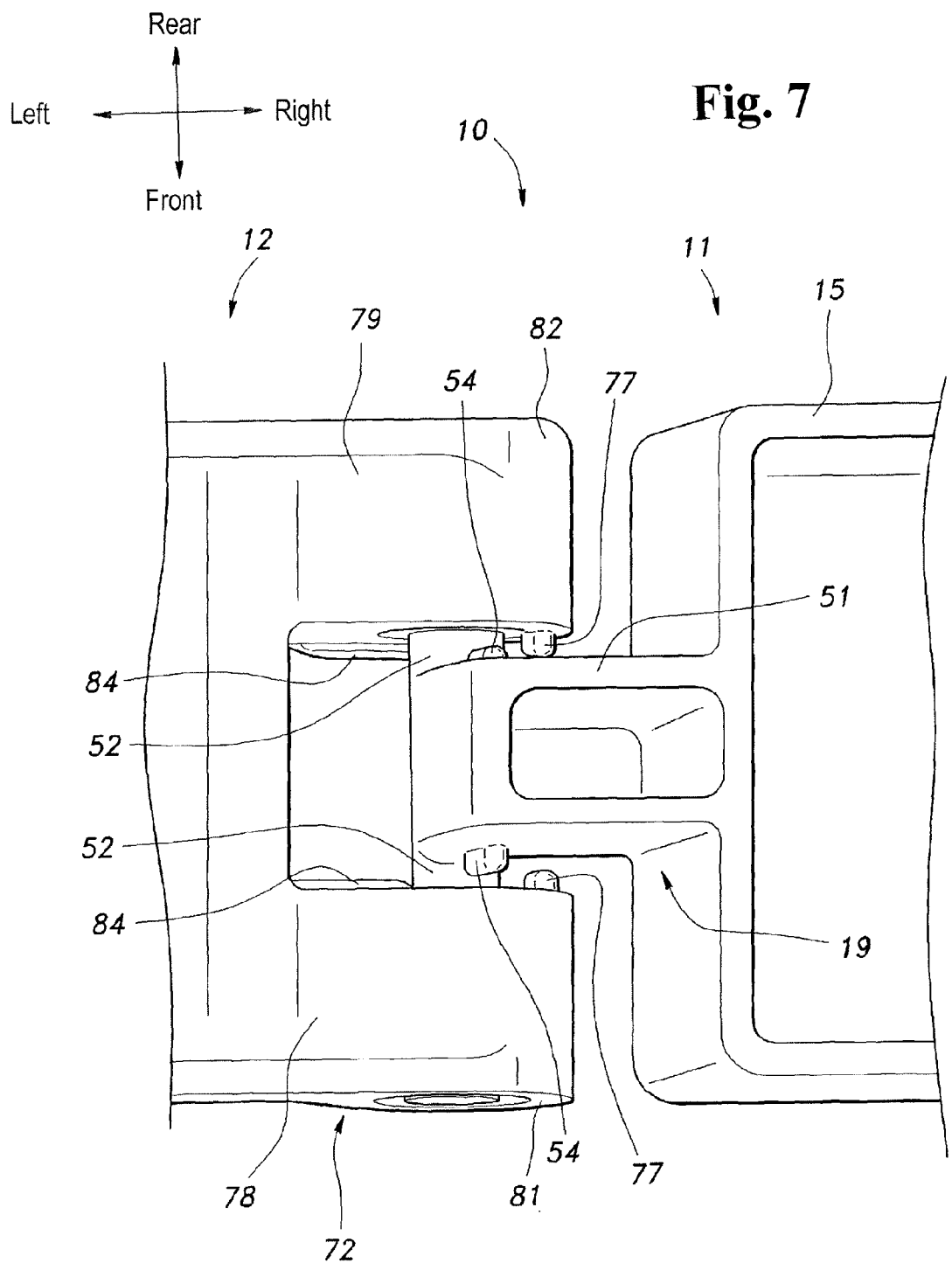
FIG. 7 is a perspective view of the hinge part of the pipe clamp according to the first embodiment viewed from beneath (state in which the lid member is open on the base member).

As illustrated in FIGS. 3 and 7, overhanging parts 84 and 84 projecting in a direction of moving closer to each other are formed extending in the left to right direction on mutually opposite portions on upper half parts and base end parts (left half parts) of the front fork part 78 and the rear fork part 79. Also, raised parts 77 and 77 projecting in a direction of moving closer to each other are formed on mutually opposite portions of each shaft bearing part 81 and 82. The distance from front to rear of both shaft bearing parts 81 and 82 is set larger than the length from front to rear of the shaft support part 51, and the lid member 12 has play in the front to rear direction against the base member 11 in a state in which the lid member 12 is open with respect to the base member 11 (the state illustrated in FIGS. 1 to 7, being the state in which the lid 12 is positioned to the left of the base member 11). The raised parts 77 and 78 and the raised parts 54 and 54 reduce the play between the shaft support part 51 and each shaft bearing part 81 and 82 in the state in which the lid member is open with respect to the base member.

Figure 8:
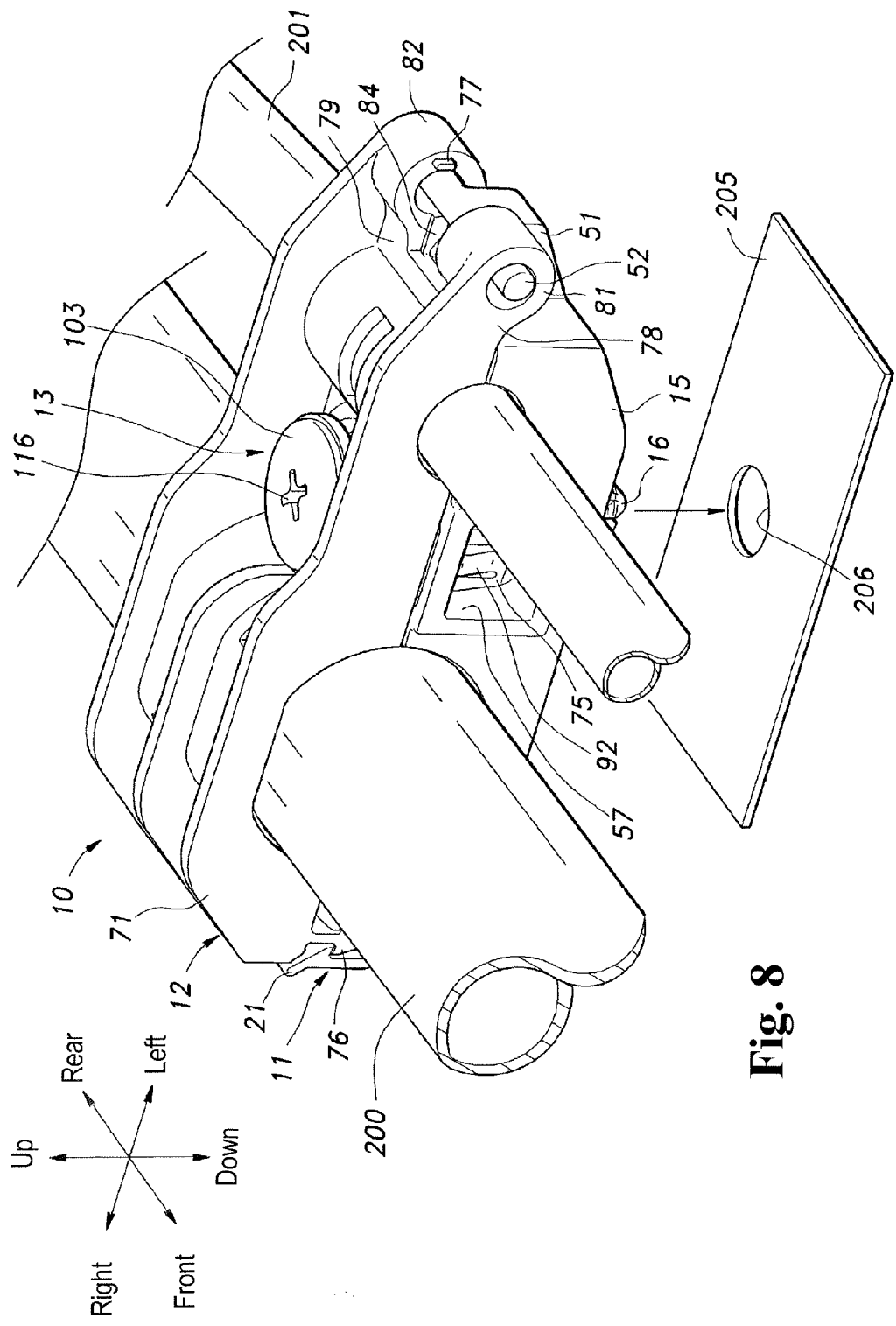
FIG. 8 is a perspective view illustrating a structure in which a filler pipe and a breather pipe are installed on a vehicle body panel using the pipe clamp according to the first embodiment.

As illustrated in FIG. 1, a circular access hole (second member through-hole) 86 running through in the vertical direction is formed in a part roughly in the center in the left to right direction of the upper part of the main body part 71. The access hole 86 is arranged so as to be coaxial with the pin hole 25 in a state in which the lid member 12 is closed with respect to the base member 11 (the state illustrated in FIGS. 8 to 10, wherein the lid member 12 is positioned above the base member 11). Also, the diameter of the access hole 86 is formed larger than the outer diameter of the boss part 34.

A third pipe holding part 73 and a fourth pipe holding part 74 are placed in recessed form, respectively toward the left and toward the right of the access hole 86 on the upper part of the main body part 71. The third pipe holding part 73 and the fourth pipe holding part 74 have groove forms, and each extends in the front to rear direction continuing on the front surface and rear surface of the lid member 12. The third pipe holding part 73 is formed in a flattened semicircular form in section so as to correspond with the outer surface of the filler pipe 200 to be described. Also, the fourth pipe holding part 74 is formed in a roughly semicircular form in section so as to correspond with the outer surface of the breather pipe 201 to be described. The third pipe holding part 73 faces opposite the first pipe holding part 17, and the fourth pipe holding part 74 faces opposite the second pipe holding part 18, in the state in which the lid member 12 is closed with respect to the base member 12.

Ridges 87 and 88 extending from the left to right direction are formed on upper surfaces of the third pipe holding part 73 and the fourth pipe holding part 74. Also, pressing pieces 89 and 90, each being cut out by a U-shaped slit connecting through to the lower part of the main body part 71 and having a raised part projecting inward (upward) of the third pipe holding part 73 and the fourth pipe holding part 74 on a leading end part thereof, are formed on the upper surfaces of the third pipe holding part 73 and the fourth pipe holding part 74. The pressing pieces 48 and 49 are flexible and are capable of toppling.

Two connection pieces 75 are placed projecting upward to the front and rear of the access hole 86 on the upper part of the main body part 71. A claw part 92 being cut out by a U-shaped slit is formed on a side part of each connection piece 75. The claw part 92 is provided to be capable of toppling on the connection piece 75, and is made movably in and out with respect to the connection piece 75 by being elastically deformed.

Two claw parts 76 are provided at a distance from each other in the front to rear direction on a left end part on the upper part of the main body part 71. Each connection claw 76 extends upward, and has a triangular enlarged head part on a leading end part. A tetragonal tube-form reinforcing part 93 is provided between the connection claws 76, and the connection claws 76 are reinforced.

<Pin Member>

Figure 5:
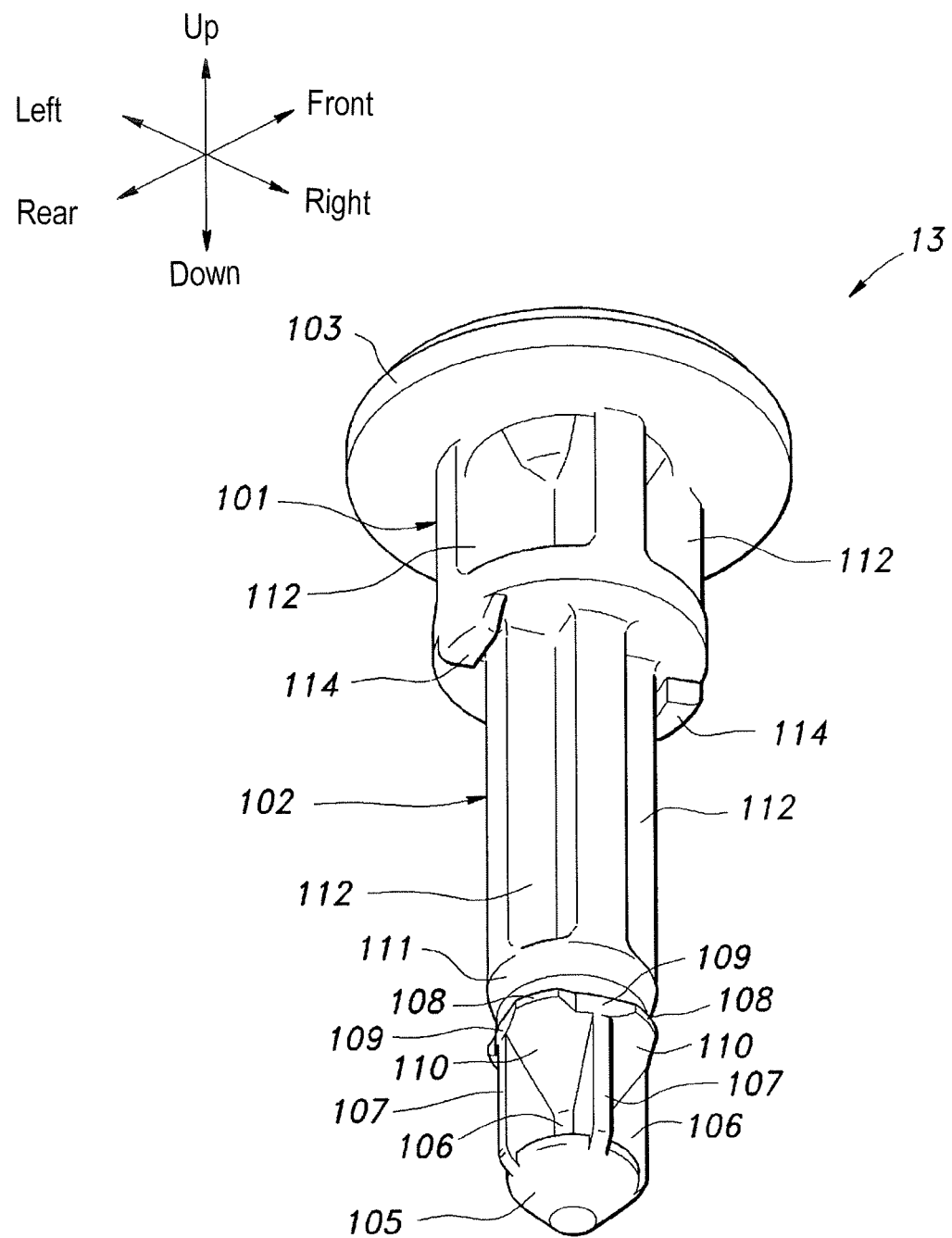
FIG. 5 is a perspective view illustrating the pin member according to the first embodiment.

As illustrated in FIG. 5, the pin member 13 has a round-columnar large-diameter shaft part 101, a small-diameter shaft part 102 being provided coaxially on one end of the large-diameter shaft part 101 and having a smaller diameter than that of the large-diameter shaft part 101, and a flange part 103 being provided on the other end side of the large-diameter shaft part 101. The outer diameter of the small-diameter shaft part 102 is formed smaller than the inner diameter of the lower half part 27 of the pin hole 25. The outer diameter of the large-diameter shaft part 101 is formed smaller than the inner diameter of the upper half part 26 of the pin hole 25 and larger than the inner diameter of the lower half part 27. The outer diameter of the flange part 103 is formed larger than the inner diameters of the upper half part 26 and the boss part 34 and smaller than the inner diameter of the access hole 86.

The small-diameter shaft part 102 has a conical leading end part 105. Four recessed parts 106 being formed at equal spacing in the circumferential direction are formed above a leading end part 105 of the small-diameter shaft part 102. A dividing wall 107 is provided between adjacent recessed parts 106. A locking ridge 108 extending in the circumferential direction is placed projecting above each recessed part 106 of the small-diameter shaft part 102. The length in the circumferential of the locking ridge 108 is formed shorter in comparison with the circumferential direction of the recessed part 106. A valley part 109 exposing the circumferential surface of the small-diameter shaft part 102 is formed in a portion (the portion positioned above the dividing wall 107) between adjacent locking ridges 108 in the circumferential direction. A portion becoming a side wall on an upper side of each recessed part 106 is formed as an inclined surface 110 continuing smoothly to the projecting end of the locking ridge 108. A restricting wall 111 continuing across the circumferential direction of the small-diameter shaft part 102 is placed extending on a portion of the small-diameter shaft part 102 at a prescribed spacing upward from the locking ridge 108.

Two downwardly projecting raised parts 114 are formed on a lower surface of the large-diameter shaft part 101. The raised parts 114 are formed in the same shape, and are provided in symmetric positions with the axis of the large-diameter shaft part 101 as the symmetry axis. Also, a tool hole (for example, plus-shaped hole) 116 allowing coupling with a tool (for example, plus screwdriver) is formed on an upper surface of a flange part 103. Dugout parts 112 are formed in suitable places on the large-diameter shaft part 101 and the small-diameter shaft part 102.

As illustrated in FIG. 1, the pin member 13 is inserted into the upper end side of the pin hole 25 from the leading end part 105. Before insertion of the pin member 13 into the pin hole 25, a flexible annular seal member 121 is installed on an outer perimeter part of the large-diameter shaft part 101 of the pin member 13, and a flexible annular seal member 122 is installed on an outer perimeter part of the leg pieces 16.

When the pin member 13 is inserted into the pin hole 25, the leading end part 105 of the pin member 13 contacts with the inclined surface of the projecting part 37 and the claw part 38 of each leg piece part 16. When the pin member 13 is pushed further into the pin hole 25 from this state, each leg part 16 is elastically deformed outwardly in the radial direction of the pin hole 25, and the leading end part 105 passes the claw part 38. In the state in which the leading end part 105 has passed the claw part 38, each leg piece part 16 returns to the initial state by a return force, and the projecting part 37 and the claw part 38 are received inside the recessed part 106 (see FIG. 4). Thus, the projecting part 37 and the claw part 38 are locked in the recessed part 106, whereby the pin member 13 is held inside the pin hole 25. The pipe clamp 10, in which the base member 11, lid member 12, pin member 13, and seal members 121 and 122 are integrally assembled, is thus configured in the above manner (see FIGS. 2 to 4).

<Operation and Effect of the First Embodiment>

A method for installing a filler pipe 200 and a breather pipe 201 on a vehicle body panel 205 using the pipe clamp 10 described above, and an installation structure thereof, are next described. The filler pipe 200 is a pipe for connecting between a fuel supply port and a fuel tank of an automobile, and its cross-sectional shape is a flattened shape of a deformed circle. The breather pipe 201 is a pipe being provided generally in parallel with the filler pipe 200 for allowing escape of gas inside the fuel tank during fuel supply. The vehicle body panel 205 is a flat plate-form panel, and has a circular locking hole 206 formed thereon.

Figure 10:
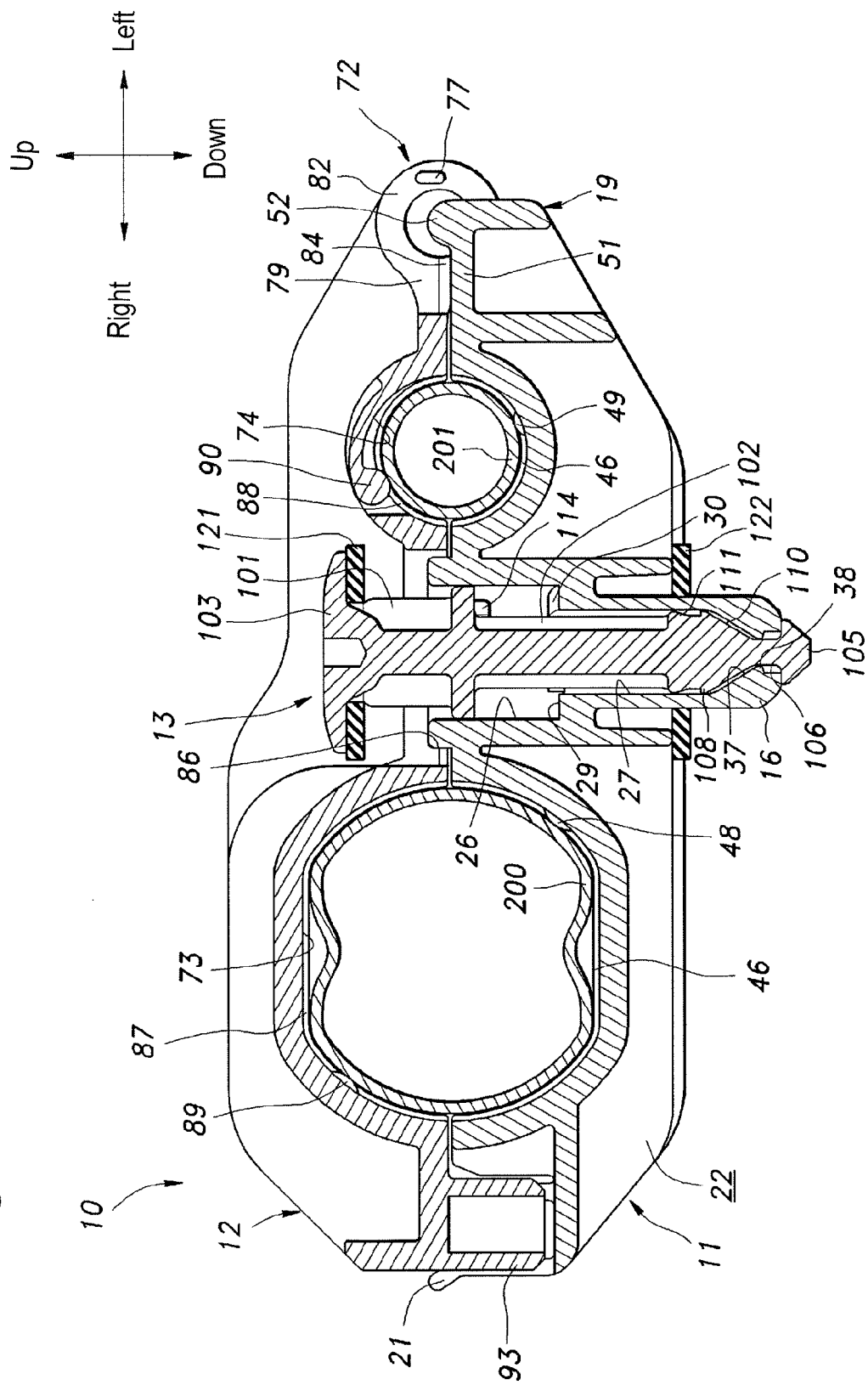
FIG. 10 is a cross-sectional view illustrating a structure in which a filler pipe and a breather pipe are installed on a vehicle body panel using the pipe clamp according to the first embodiment (state in which the leg piece part is inserted into the clocking hole).

First, a state in which the lid member 12 is open with respect to the base member 11 is established, the filler pipe 200 is arranged inside the first pipe holding part 17 of the base member 11, and the breather pipe 201 is arranged in the second pipe holding part 18. Next, the lid member 12 is rotated on the base member 11 so that the upper part of the base member 11 is covered by the lid member 12. By this, the filler pipe 200 is arranged inside the third pipe holding part 73, and the breather pipe 201 is arranged inside the fourth pipe holding part 74. In this state, the connection claw 201 of the base member 11 and the connection claw 76 of the lid member 12 are coupled, and the connection hole 20 of the base member 11 and the connection piece 75 of the lid member 12 are coupled, whereby the lid member 12 is secured on the base member 11 (see FIG. 8). By this, the filler pipe 200 is held between the first pipe holding part 17 and the third pipe holding part 73, and the breather pipe 201 is held between the second pipe holding part 18 and the fourth pipe holding part 74. At this time, as illustrated in FIG. 10, the ridges 46, 47, 87, and 88 and the pressing pieces 48, 49, 89, and 90 contact with the filler pipe 200 and the breather pipe 201, whereby the filler pipe 200 and the breather pipe 201 are held in a stable state inside each pipe holding part 17, 18, 73, and 74.

Figure 9:
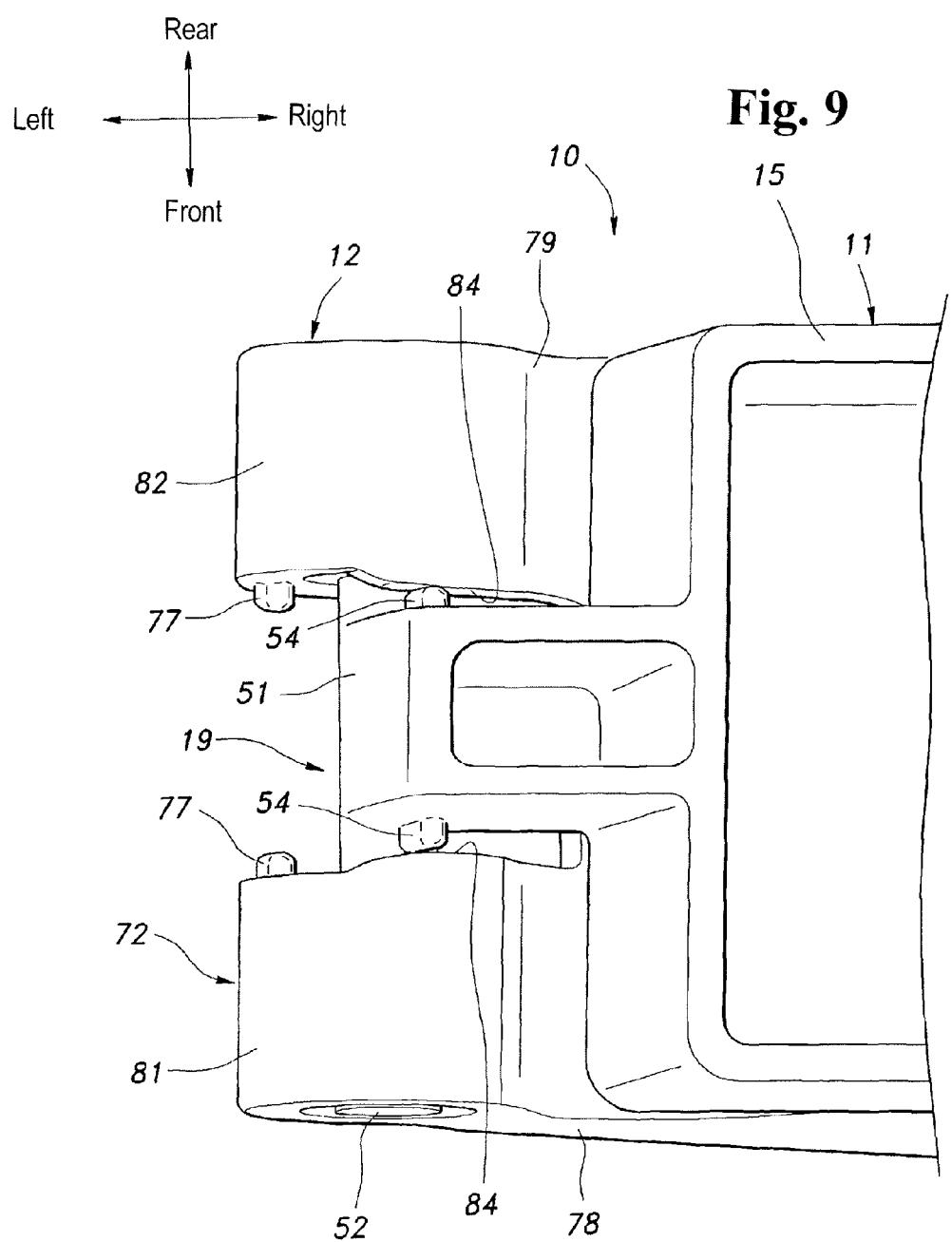
FIG. 9 is a perspective view of the hinge part of the pipe clamp according to the first embodiment viewed from beneath (state in which the lid member is closed on the base member).

In the state in which the lid member 12 is closed with respect to the base member 11, as illustrated in FIG. 9, the raised part 54 of the hinge shaft part 19 faces opposite the overhanging part 84 of the hinge shaft bearing part 72 in the front to rear direction. By this, a gap between the shaft support part 51 and the front or rear fork part 78 or 78 becomes smaller, and rattling is reduced.

Also, in the state in which the lid member 12 is closed with respect to the base member 11, the flange part 103 of the pin member 13 passes through the access hole 86 of the lid member 12 and projects upward.

Next, the four leg piece parts 16 are inserted into the locking hole 206 of the vehicle body panel 205, and the lower part (lower end of each rib 23) of the base member 11 is placed in contact with the upper surface of the vehicle body panel 205. In this state, the flange part 103 of the pin member 13 is pressed by a finger or a tool to the side of the base member 11. When the pin member 13 moves to the leading end side of the leg piece parts 16, the projecting parts 37 and the claw parts 38 of the leg piece parts 16 are pressed on the inclined surface 110 of the pin member 13, and the leading end part of each leg piece part 16 is displaced outward in the radial direction of the pin hole 25. As the movement of the pin member 13 against the leg piece parts 16 progresses, the claw parts 38 slide on the inclined surface 110 and ride up past the locking ridge 108. After that, the raised part 114 of the pin member 13 contacts with the bottom surface 29 of the step part 28, and movement of the pin member 13 against the leg piece part 16 is restricted.

Figure 11:
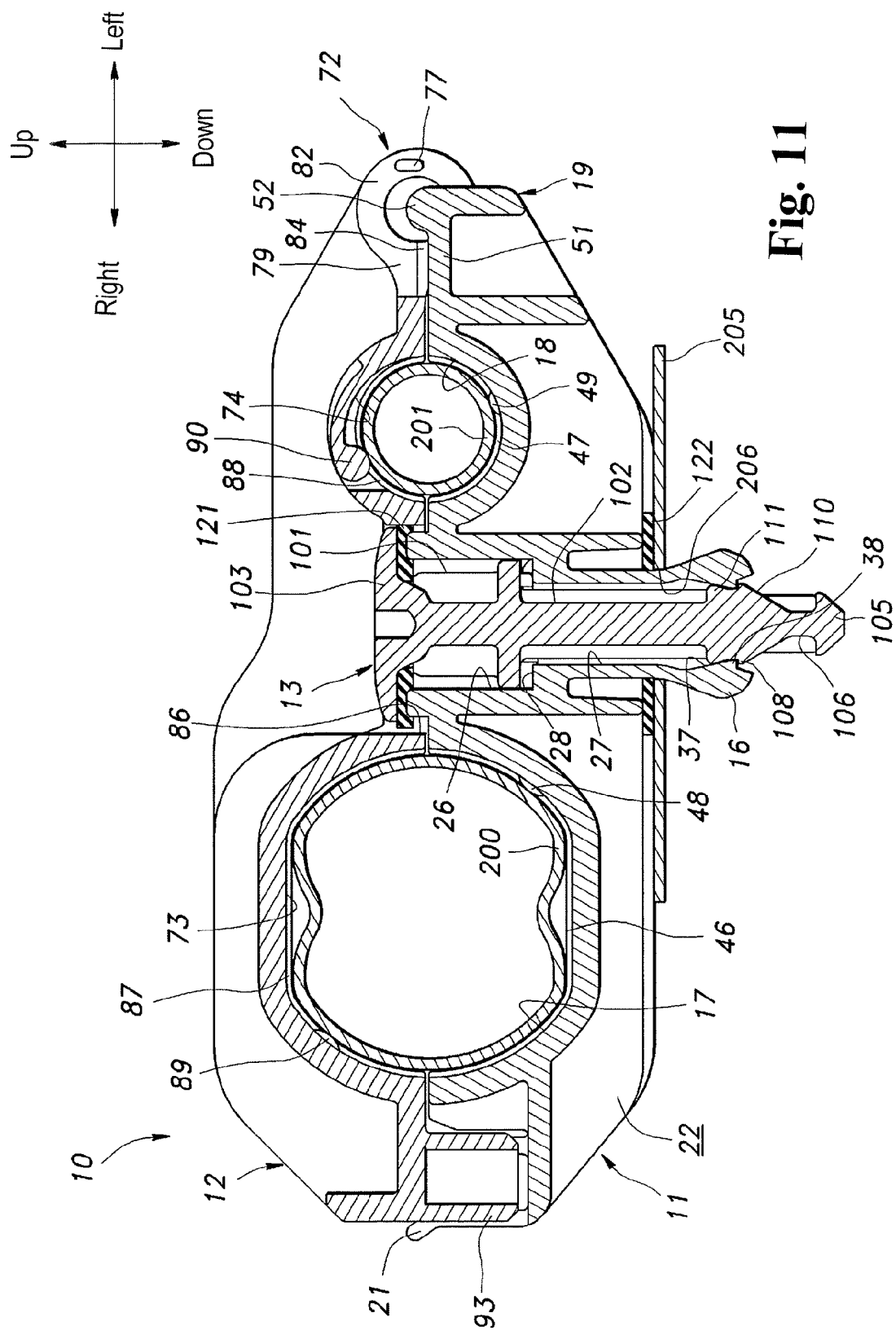
FIG. 11 is a cross-sectional view illustrating a structure in which a filler pipe and a breather pipe are installed on a vehicle body panel using the pipe clamp according to the first embodiment (state in which the pin member was pushed in and the leg piece part is locked in the locking hole).

In this state, as illustrated in FIG. 11, the projecting part 37 and the claw part 38 come out from the recessed part 106, a state in which the claw part 38 is in contact with the outer perimeter surface of the small-diameter shaft part 102 arises, and the leading end parts of the leg piece parts 16 are kept in a state being oriented outward in the radial direction of the pin hole 25. By this, the leg piece parts 16 are locked in the locking hole 206, and the leg piece parts 16 are prevented from coming out from the locking hole 206. In this state, the claw part 38 is locked on the locking ridge 108, and therefore removal of the pin member 13 from the pin hole 25 is prevented.

At this time, the flange part 103 of the pin member 13 seals the upper end of the boss part 34 by way of the seal member 121, and the perimeter edge part on the lower end of the pin hole 25 of the base member 11 seals the perimeter edge part of the locking hole 206 by way of the seal member 122. By this, the locking hole 206 is sealed water-tightly.

The method for removing the pipe clamp 10 from the vehicle body panel 205 is next described. First, a tool (for example, plus screwdriver) is coupled in the tool hole 116 of the pin member 13. Also, the pin member 13 is rotated counterclockwise as viewed from above. By this, each claw part 38 of each leg piece part 16 comes out in the vertical direction from a position being opposite the locking ridge 108 of the pin member 13 and becomes opposite the valley part 109. At the same time, the raised part 114 of the pin member 13 slides on the step part 28 from the bottom surface 29, past the inclined surface 31, and to the upper surface 32, and the pin member 13 is displaced upward with respect to the base member 11. From this state, when the flange part 103 is grasped and the pin member 13 is pulled out upward with respect to the base member 11, the claw part 38 slides on the end surface of the dividing wall 107, and can reach up to the leading end part 105 without catching on the recessed part 106. Also, in the case when one does not intend to pull the pin member 13 completely out from the base member 11, when the pin member 13 is rotated against the base member 11 in a state in which the claw part 38 is positioned on the end surface of the dividing wall 107, the claw part 38 is received inside the recessed part 106, and the leg piece parts 16 return to the initial state. In the above state, because the leg piece parts 16 are in the initial state (are not displaced outward in the radial direction of the pin hole 25), the leg piece parts 16 can be removed from the locking hole 206.

The method for removing the filler pipe 200 and the breather pipe 201 from the pipe clamp 10 is next described. The connection claw 21 is toppled using a finger, tool, or the like, and the locked state with the connection claw 76 is unlocked. Also, the claw part 92 of the connection piece 75 is toppled using a finger, tool, or the like, through the operating opening 57, and the coupling between the connection piece 75 and the connection hole 20 is released. By this, the lid member 12 can be opened with respect to the base member 11, and the filler pipe 200 and the breather pipe 201 can be removed from the pipe clamp 10.

The pipe clamp 10 according to the first embodiment is easy to handle, and the operation of installation of a filler pipe 200, or the like, on a vehicle body panel 205 is easy, because the base member 11, lid member 12, pin member 13, and seal members 121 and 122 are integrally assembled. Also, the installation operation is easy also because there is no need to use a tool when installing the filler pipe 200, or the like, on the vehicle body panel 205.

Also, parts can be delivered in a state being assembled on other members is possible because the pipe clamp 10 can obtain a state being coupled only with a filler pipe 200 or other tubular body, or a state being coupled only with a vehicle body panel 205. For example, parts can be delivered to an automobile manufacturer in a state in which the pipe clamp 10 is assembled on a filler pipe 200 and a breather pipe 201.

It is preferable that the leg piece parts 16 be arranged in roughly the center part of the base member 11 from the viewpoint of stability of installation on the vehicle body panel 205. Also in such case, because the access hole 86 is formed on the lid member 12, the pin member 13 is exposed to the outside without being covered by the lid member 12, and the operation of pressing the pin member 13 against the base member 11 becomes possible.

Because the pipe clamp 10 can be removed from the filler pipe 200, breather pipe 201, and vehicle body panel 205 without being damaged as described above, the pipe clamp is suitable for reuse.

<Second Embodiment>

The pipe clamp 300 according to the second embodiment differs from that of the first embodiment in that the pin hole 25 and the leg piece parts 16 are provided on the lid member 12. With respect to the second embodiment, the same symbols are assigned to the same configurations as in the first embodiment, and the descriptions are omitted.

Figure 12:
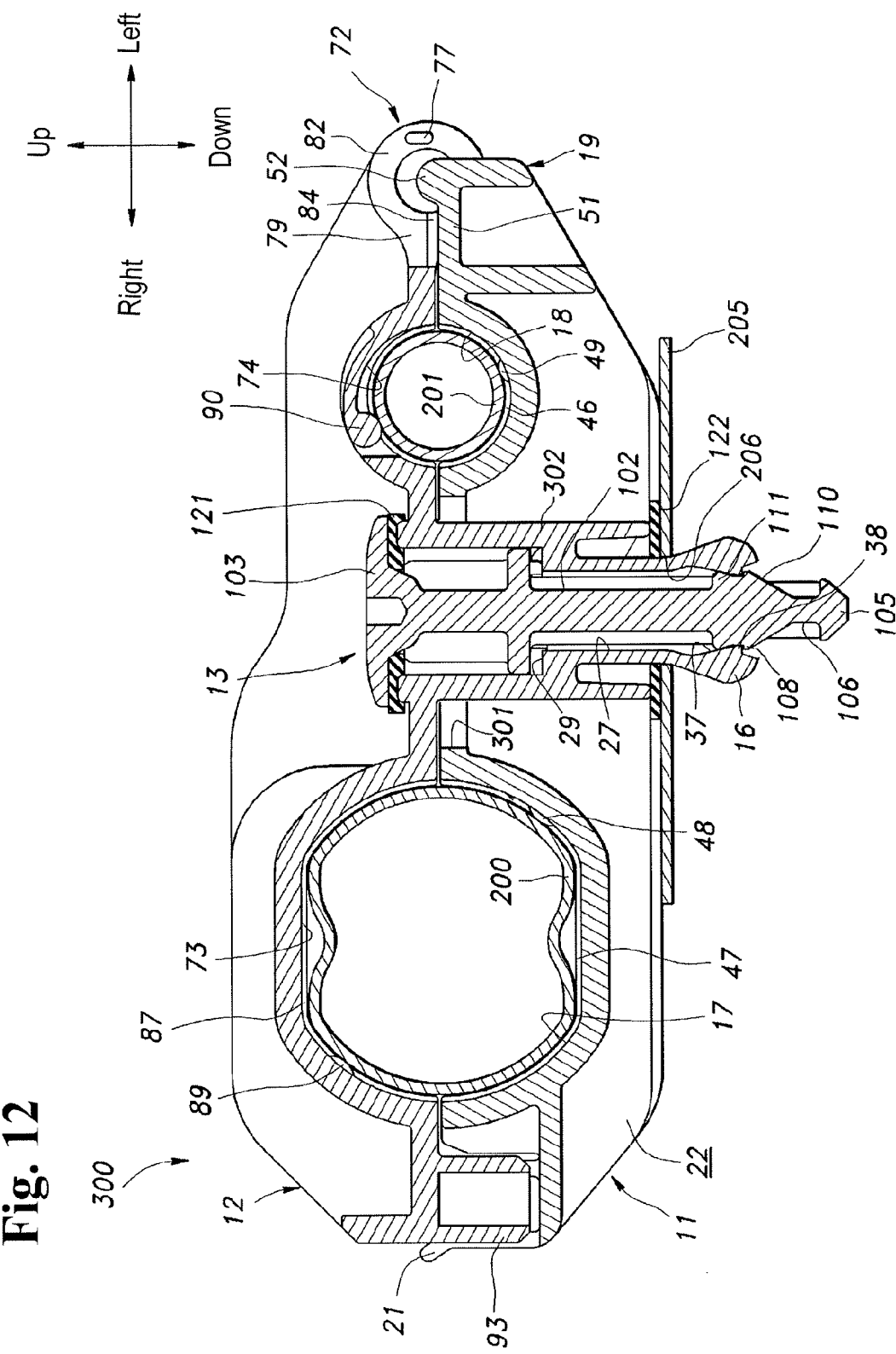
FIG. 12 is a cross-sectional view illustrating a structure in which a filler pipe and a breather pipe are installed on a vehicle body panel using the pipe clamp according to the second embodiment (state in which pin member was pushed in and the leg piece part is locked in the locking hole).

As illustrated in FIG. 12, the base member 11 has a through-hole (first member through-hole) 301 running in the vertical direction through the base member 11 between the first pipe holding part 17 and the second pipe holding part 18. The lid member 12 has a boss part 302 between the third pipe holding part 73 and the fourth pipe holding part 74. The length in the axial direction of the boss part 302 is set so as to pass through the through-hole 301 and extend up to the lower end of the base member 11 in the state in which the lid member 12 is closed with respect to the base member 11. The same kind of pin hole (second member through-hole) 25 as in the first embodiment is formed inside the boss part 302.

A dugout part 35 is formed on an end surface on a lower end of the boss part 302 in FIG. 12 so as to surround the pin hole 25, and just as in the first embodiment, four downwardly projecting leg piece parts 16 are formed at equal spacing following the circumferential direction of the pin hole 25 from a portion inside the portion where the dugout part 35 is formed.

Because the lid member 12 is secured directly on the vehicle body panel 205 when being configured as above, the lid member 12 becomes more difficult to open with respect to the base member than in the pipe clamp 10 of the first embodiment, and the stability of installation of the filler pipe 200 and the breather pipe 201 on the vehicle body panel 205 is improved.

The descriptions of specific embodiments are finished above, but the present invention is not limited to the above embodiments, and can be carried out in a wide variety of different forms. For example, in the first embodiment, the structure was such that the upper end of the pin member 13 being held in the pin hole 25 passes through the access hole 86 and extends upward in the state in which the lid member 12 is closed with respect to the base member 11, but the configuration may also be such that the upper end of the pin member 13 is arranged further downward from the access hole 86. In this case, the size of the access hole 86 should be set to a size so that at least one part of the upper end of the pin hole 13 is exposed to the outside when viewed from above and the upper end of the pin member 3 can be pressed by a finger, tool, or the like. In the case when a tool hole 116 is provided, at least the tool hole 116 must be exposed to the outside through the access hole 86.

The numbers and shapes of pipe holding parts being formed on the base member 11 and the lid member 12 can be set optionally. The pipes being held by the pipe clamp are not limited to filler pipes, and the like, and may be various kinds of pipes. Also, the pipe clamp can hold not only pipes, but also wires and harnesses in substance, and the like.

In the embodiments described above, the leg piece parts 16 are coupled in the locking hole 206 after the filler pipe 200 and the breather pipe 201 are held by the pipe clamp 10, but the filler pipe 200 and the breather pipe 201 may be held by the pipe clamp 10 after the leg piece parts 16 are coupled in the locking hole 206.

Explanation of the Symbols 10, 300: Pipe clamp (clamp), 11: Base member (first member), 12: Lid member (second member), 13: Pin member, 16: Leg piece part, 17: First pipe holding part (tubular body holding part), 18: Second pipe holding part (tubular body holding part), 19: Hinge shaft part, 20: Connection hole, 21: Connection claw, 25: Pin hole (first member through-hole in first embodiment, second member through-hole in second embodiment), 34: Boss part, 37: Projecting part, 38: Claw part, 51: Shaft support part, 52: Hinge shaft, 72: Hinge shaft bearing part, 73: Third pipe holding part, 74: Fourth pipe holding part, 75: Connection piece, 76: Connection claw, 78: Front fork part, 79: Rear fork part, 81, 82: Shaft bearing part, 84: Overhanging part, 86: Access hole (second member through-hole), 105: Leading end part, 106: Recessed part, 107: Dividing wall, 108: Locking ridge, 109: Valley part, 110: Inclined surface, 116: Tool hole, 121, 122: Seal member, 200: Filler pipe (tubular body), 201: Breather pipe (tubular body), 205: Vehicle body panel (support member), 206: Locking hole, 301: Through-hole (first member through-hole), 302: Boss part

What is claimed is:

1. A clamp for installing a tubular body on a support member having a locking hole, comprising:
    a first member arranged on a surface of said support member and having a first member through-hole formed in a position corresponding to said locking hole, said first member having a plurality of flexible leg piece parts projecting from a perimeter edge part of said first member through-hole on a support member side and capable of projecting into said locking hole, and a tubular body holding part provided on a portion on a side opposite to the support member side and contactable by said tubular body;
    a second member provided rotatably on said first member and locked to said first member in a state having been rotated to a closed position covering said tubular body holding part, said second member holding said tubular body in between with said tubular body holding part; and
    a pin member held in said first member through-hole, said pin member being displaced toward a leading end side of said leg piece parts to displace said leg piece parts outwardly in a radial direction of said first member through-hole to engage said leg piece parts with said locking hole;
    wherein said second member has a second member through-hole exposing an end part of said pin member on a side opposite to said support member side to an outside in the state being in said closed position.

2. A clamp according to claim 1, wherein two of said tubular body holding parts are provided to sandwich said first member through-hole when viewed from an axial direction of said first member through-hole.

3. A clamp for installing a tubular body on a support member having a locking hole, comprising:
    a first member arranged on a surface of said support member and having a first member through-hole formed in a position corresponding to said locking hole, the first member having a tubular body holding part provided on a portion on a side opposite to a support member side and contactable by said tubular body;
    a second member provided rotatably on said first member and locked to said first member in a state having been rotated to a closed position covering said tubular body holding part, said second member having a second member through-hole formed in a position corresponding to said first member through-hole in the state being in said closed position, and a plurality of flexible leg piece parts placed projecting from a perimeter edge part of said second member through-hole on the support member side and capable of passing through said first member through-hole and projecting into said locking hole; and
    a pin member held in said second member through-hole, said pin member being displaced toward a leading end side of said leg piece parts to displace said leg piece parts outwardly in a radial direction of said second member through-hole to engage said leg piece parts with said locking hole.

4. A clamp according to claim 3, wherein said second member includes a boss part on an end part of said second member through-hole on the support member side;
    said boss part passes through said first member through-hole so that a projecting end thereof is capable of contacting with the perimeter edge part of said locking hole; and
    said leg piece parts are placed to project inwardly in a radial direction of the projecting end of said boss part and are capable of projecting into said locking hole.

5. A clamp according to claim 3, wherein two of said tubular body holding parts are provided to hold said first member through-hole in between when viewed from the axial direction of said first member through-hole.

* * * * *